Nov. 16, 1937.   A. R. BOND   2,099,100
VALVE CUT-OFF INDICATOR FOR LOCOMOTIVES
Filed April 9, 1934   2 Sheets—Sheet 1
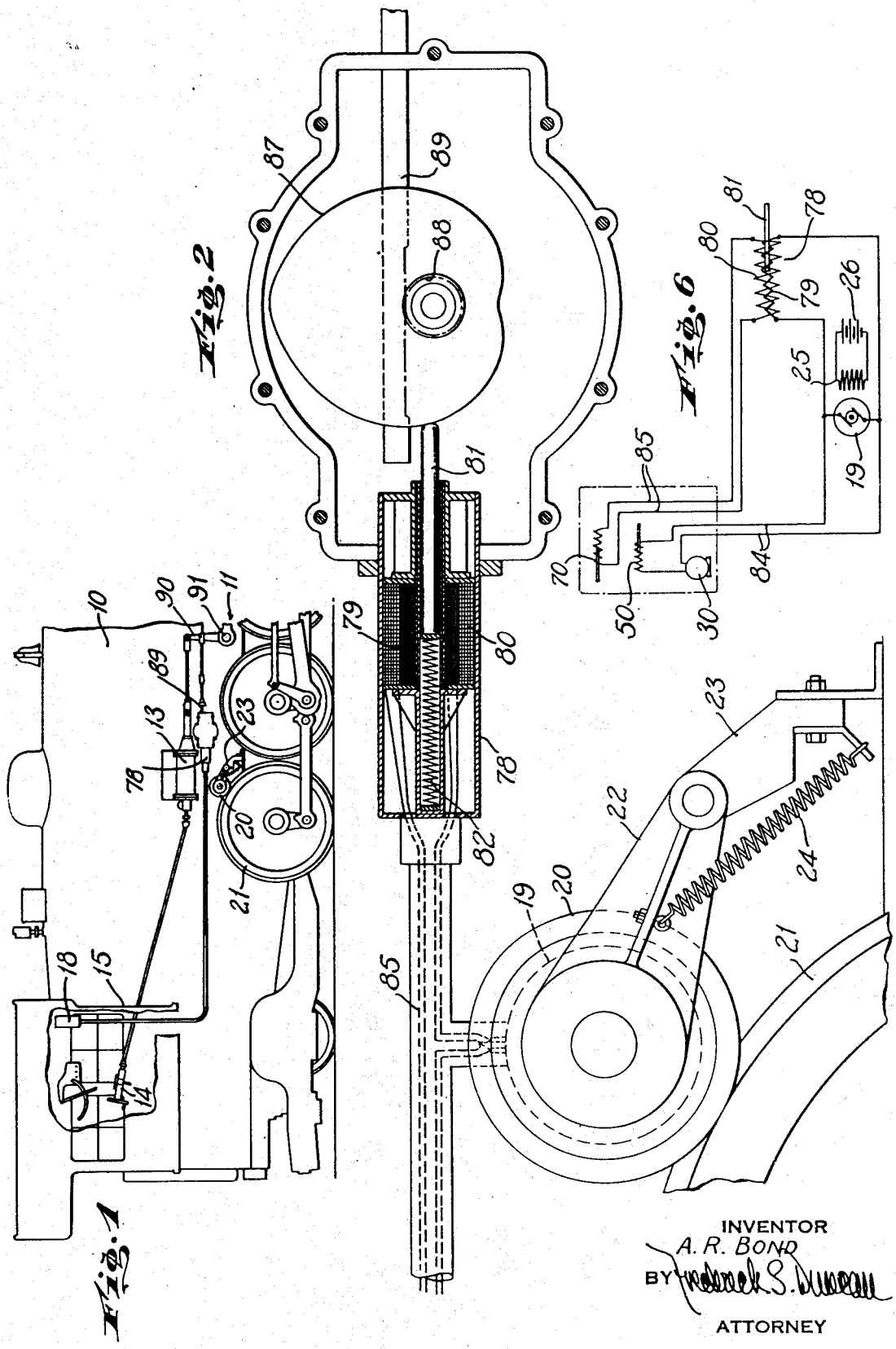
INVENTOR
A. R. BOND
BY
ATTORNEY

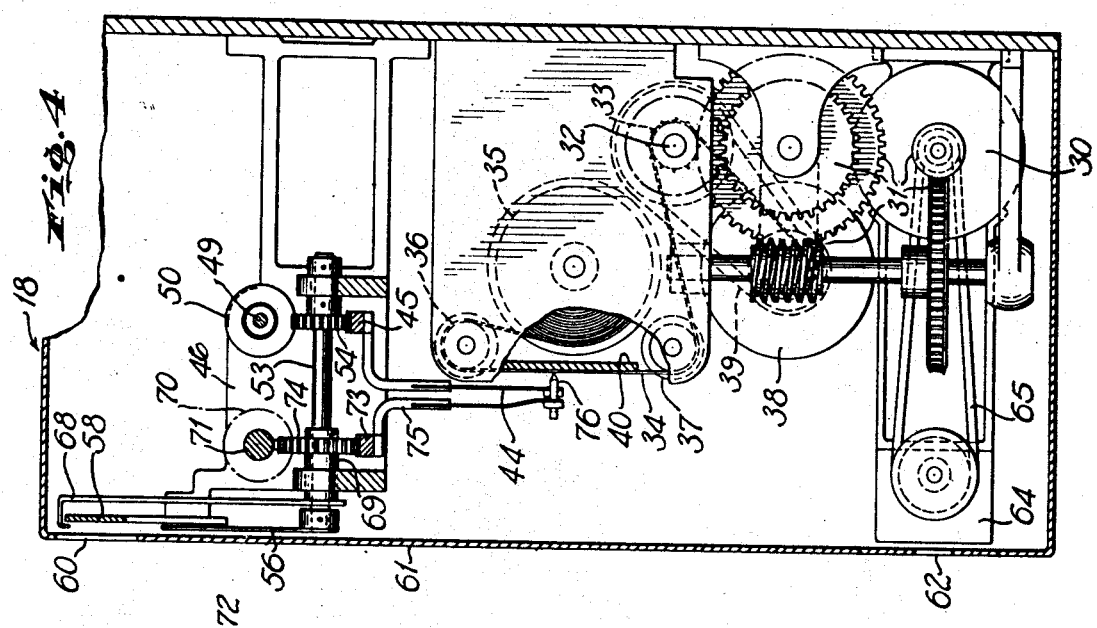

Patented Nov. 16, 1937

2,099,100

UNITED STATES PATENT OFFICE 2,099,100

VALVE CUT-OFF INDICATOR FOR LOCOMOTIVES

Alexander R. Bond, Plainfield, N. J., assignor to William Bell Wait, New York, N. Y.

Application April 9, 1934, Serial No. 719,661

7 Claims. (Cl. 105—48)

The present invention relates to valve cut-off mechanism for locomotives and has for an object to provide improved means for indicating the proper cut-off settings for different speeds.

Another object of the invention is to provide means for indicating actual cut-off settings with respect to settings which will give maximum draw bar pull.

Another object of the invention is to provide means for recording on a chart a curve indicating actual cut-off settings with respect to a base line indicating proper cut off settings to give maximum draw bar pull.

A further object of the invention is to provide on the same chart and in correlation with the actual cut-off curve another curve representing the actual speeds of the locomotive.

A more specific object of the invention is to provide electrical actuating means for producing the speed and cut-off curves.

Other objects of the invention will appear in the following description of a preferred embodiment and thereafter the novelty and scope of the invention will be pointed out in the claims.

In the accompanying drawings;

Figure 1 is a fragmental view of a locomotive equipped with my improved cut-off and speed indicating means;

Fig. 2 is a somewhat diagrammatic view, partly in section on a much larger scale, of an electrical generator directly driven by a traction wheel of a locomotive and a transformer energized thereby, with cam control means for modifying the secondary voltage of the transformer in accordance with the cut-off setting;

Fig. 3 is a view in front elevation of an indicating and recording instrument with the casing thereof partly broken away to reveal interior details;

Fig. 4 is a view in section taken on the line 4—4 of Fig. 3;

Fig. 5 is a fragmental view of a record made by said instrument; and

Fig. 6 is a diagram of electrical circuits employed.

It is well-known in the art that for any given speed of a locomotive there is a particular setting of the cut-off valve which will give maximum draw bar pull. The efficient operation of a locomotive consists in regulating the cut-off to give maximum draw bar pull when starting and coming up to speed and also sometimes when running up grade, but after the requisite speed has been obtained it is desirable to advance the cut-off so as to economize steam.

The present instrument is adapted to give the locomotive engineer a guide as to the proper cut-off to employ. To this end it embodies an instrument in the cab of the locomotive having a dial on which there is a zero point, and a cut-off pointer movable with respect to said point. Movement of this indicator is controlled not only by the actual setting of the cut-off valve but also by the speed of the locomotive and the ratio is such that if the engineer operates the reverse lever in such manner as to hold the pointer on the zero mark he will be driving the locomotive at its maximum draw bar pull. If, however, the pointer departs from this zero setting in one direction it indicates that he is economizing steam whereas movement in the other direction indicates waste of steam. The instrument also makes a record of the actual cut-off settings with respect to the maximum power line and simultaneously makes a record of the distance travelled and variations of speed in the travel of the locomotive so that at the end of a run the record will show just how efficiently the locomotive was operated.

As shown in Fig. 1, the locomotive 10 is provided with the usual valve gear indicated generally by the reference numeral 11. This valve gear is controlled by the usual operating cylinder 13 or other means under control of a reverse lever or hand wheel 14 in the cab 15 of the locomotive. Also in the cab of the locomotive is an indicating and recording instrument 18 which is shown in detail in Figs. 3 and 4. This instrument is electrically actuated and the current for operating the instrument is supplied by a generator 19 which has a traction wheel 20 that bears on a locomotive wheel 21. To this end the generator and its traction disk 20 are mounted on an arm 22 which is pivoted on a bracket 23 carried by a relatively fixed part of the locomotive, and a spring 24 tends to draw the traction disk 20 against the locomotive wheel 21. It is intended that the surface speed of the traction wheel 20 shall equal the speed of the locomotive on its rails and to this end the disk 20 may bear against any locomotive wheel that runs on the rails. The generator 19 is of the single phase A. C. induction type with an exciting coil 25 which is energized from any suitable source of direct current, such, for instance, as the auxiliary D. C. generator usually provided on locomotives, but indicated in the diagram conventionally as a battery 26.

Referring now to the instrument shown in Figs. 3 and 4 it will be observed that it comprises a motor 30 which drives, through suitable step-down gearing 31, a shaft 32. Fixed upon this shaft is a driving drum 33 preferably formed with teeth to engage and positively drive a tape 34. The latter is taken from a reel 35 and passes about a pair of rollers 36 and 37 before running to the driving drum 33. From the latter the tape runs to a take-up drum 38 which is flexibly driven through a slipping belt 39 by the shaft 32. Between the rollers 36 and 37 there is a platen 40 which serves as a backing for the tape to support the same as it is being marked by the speed stylus and the cut-off stylus as will be explained presently.

The speed stylus is indicated at 43. It is carried by an arm 44 depending from a rack 45 which slides lengthwise in a direction transverse to that of the tape. This rack is suitably supported in a bracket 46 and has an upwardly projecting arm 48 which is secured to the sliding core 49 of a solenoid 50. A spring 51 normally urges the core 49 outwardly and when the solenoid 50 is energized the core is pulled inwardly against the pressure of the spring to an extent determined by the degree of energization of the coil.

A shaft 53 is disposed transversely to the rack 45 and is suitably mounted to rotate in the bracket 46. A pinion 54 fixed on this shaft meshes with the rack 45. Fixed upon the forward end of shaft 53 is a hand 56 which is swung in front of a dial 58 by the rack 45. This dial is calibrated at 59 in miles per hour, or any other suitable units of speed. An arcuate window 60 is formed in the front wall of the casing 61 of the instrument to permit of observing the movement of the hand 56. Another window 62 is provided in the lower part of the front wall of the casing to reveal the dial 63 of an odometer 64. The latter is driven by a belt 65 from a suitable element of the step-down gearing 31.

In addition to the speed calibrations on the dial 58 there is another set of calibrations indicated by the reference numeral 66 and having a zero mark in the vertical axis of the dial. Over this dial moves a pointer 68 which is connected to a sleeve 69 freely rotatable on the shaft 53. This pointer is actuated by a solenoid 70 which, like the solenoid 50, is provided with a sliding plunger 71 normally pressed outward by a spring 72. This plunger is connected to a rack 73 which slides in the bracket 46 and engages a pinion 74 fixed upon the sleeve 69. Thus, by variations in the pull of the solenoid 70, the pointer 68 will be moved in one direction or the other. Depending from the rack 73 is an arm 75 which carries a cut-off stylus 76 bearing on the tape 34 in front of the platen 40.

Referring now to Fig. 2, it will be observed that adjacent the generator 19 there is a transformer 78 comprising a primary coil 79 and a secondary coil 80. The transformer is provided with a slidable core 81 which is normally pressed outwardly or to the right, as viewed in Fig. 2, by means of a spring 82.

An inspection of the diagram of electrical connections in Fig. 6, shows that the output circuit 84 of the generator 19 includes in series the motor 30, the solenoid 50 and the primary coil 79 of the transformer 78. The secondary coil 80 is connected by suitable conductors 85 to the solenoid 70.

The operation of the apparatus, as so far described, is as follows: The generator 19 produces current which varies in potential in proportion to the speed of the generator. Since this speed is dependent upon the speed of the locomotive we have an output of potential which is proportional to the speed of the locomotive. The motor 30 is also variable in speed in proportion to the potential impressed thereon and consequently it will drive the tape 34 at a speed which will be in direct ratio to that of the locomotive. This tape, as shown in Fig. 5, is provided with transverse lines M indicating miles or other units of distance and the length of the marking made by either of the styluses on the tape will indicate the distance traveled. The speed of the locomotive will be indicated by the hand 56 because the movement of the hand is controlled by the solenoid 50 and the pull of this solenoid will vary in proportion to variations of output of the generator 19. Consequently, the stylus 43 will move transversely across the tape producing a speed curve. On this tape, as indicated in Fig. 5, longitudinal lines S indicate miles per hour or any other suitable unit of speed, so that the speed of the locomotive at various points in its travel will be recorded.

The movement of the cut-off stylus is also affected by the speed of the locomotive because its movement is controlled by the solenoid 70 which receives its power inductively through the transformer 78 from the generator 19. Consequently as the speed of the locomotive varies, the stylus 76 and also the hand 68 would tend to move to an extent proportional to the movement of the speed hand 56, but in opposite direction because of the opposite location of the solenoids. However, the power of the solenoid 70 may be modified by moving the core 81 in and out of the transformer 78 and thus it will be evident that by proper movement of said core the pointer 68 may be brought to and maintained at the zero position. Such modification of the movement of the pointer is effected by providing a cam 87 which bears against the outer end of the core 81 and limits the extent of outward movement under pressure of spring 82. The cam 87 is connected through suitable gearing 88 including a rack 89 to the arm 90 which is fast on the tumbling shaft 91 of the valve gear. The shape of the cam 87 is such that when the reverse lever has been operated to the proper extent to adjust the cut-off for maximum draw bar pull at the particular speed at which the engine is running at that instant, the core 81 will occupy such a position as to modify the current in the secondary 80 and hence in the solenoid 70 to an extent which will bring the pointer 68 to the zero position.

In the operation, the engineman when starting operates the reverse lever to such an extent as to hold the pointer 68 on the zero mark. He will have to constantly manipulate the reverse lever to keep the pointer 68 at the zero setting, but as long as he does keep it at this setting he is assured that he has adjusted the cut-off to the setting which will give him maximum draw bar pull throughout the acceleration of the locomotive. When he has reached the desired speed he may advance the cut-off, permitting the pointer 68 to depart from the zero position as far as possible without lowering the speed of the locomotive and he then knows that he is obtaining the maximum economy of steam. A record of his performance is kept by the stylus 76 which draws a cut-off curve with respect to a base line, indicated at X in Fig. 5. This base line indicates maximum draw bar pull and the departure of the actual cut-off from this base line in either direction indicates the performance of the locomotive and the efficiency of the engineer in operating the same.

While I have described a preferred embodiment of my invention it will be understood that this is to be taken as illustrative and not limitative of the invention and that I reserve the right to make various changes in form, construction, and arrangements of parts without departing from the spirit and scope of the invention.

I claim:

1. The combination with the operating gear for the cut-off valve of a locomotive, of an electric generator driven by a track wheel of the locomotive and adapted to generate alternating current varying in potential in proportion to the speed of the locomotive, a movable needle, a solenoid adapted to move the needle, a transformer, electrical conductors connecting the generator and the primary coil of the transformer for energing said coil, electrical conductors connecting the secondary coil of the transformer and the solenoid for energizing the latter, a movable core in the transformer, and means for moving the core in accordance with the cut-off setting so as to vary the current in the secondary and hence the position of the solenoid thereby bringing the needle to a zero position at any speed of the locomotive when the cut-off is adjusted for maximum draw bar pull at such speed.

2. The combination with the operating gear for the cut-off valve of a locomotive, of an electric generator driven by a track wheel of the locomotive and adapted to generate alternating current varying in potential in proportion to the surface speed of the locomotive, a movable needle, a solenoid adapted to move the needle in accordance with the potential of the current supplied thereto, a transformer, electrical conductors connecting the generator and the primary coil of the transformer for energizing said coil by said current, electrical conductors connecting the secondary coil of the transformer and the solenoid to energize the latter, a movable core in the transformer, and a cam controlling the position of the core, said cam being operatively connected to said gear for movement in accordance with the cut-off setting, the contour of the cam being such as to modify the position of the core and thereby modify the current induced in the secondary and thus bring the needle to a zero position at any speed of the locomotive when the cut-off is adjusted for maximum draw bar pull at such speed.

3. The combination with the operating gear for the cut-off valve of the locomotive, of an indicator, an electric controller for operating the indicator, means for supplying the controller with electrical energy for actuating the same, and means for varying said energy with respect to the speed of the locomotive and the cut-off setting so as to bring the indicator to a zero position at any speed of the locomotive when the cut-off is adjusted for maximum draw bar pull at such speed.

4. The combination with the operating gear for the cut-off valve of a locomotive, of an alternating current generator driven by the rotation of a track wheel of the locomotive and having an electrical energy output variable with the track speed of said wheel, a movable indicator, an electrical actuator therefor, a transformer having a primary coil energized by said output of the generator and a secondary coil electrically connected to the actuator to energize the same, and means controlled by said operating gear for modifying the current from the secondary coil so as to bring the indicator to a zero position at any speed of the locomotive when the cut-off is adjusted for maximum draw bar pull at such speed.

5. The combination with the operating gear for the cut-off valve of a locomotive, of an alternating current generator driven by the rotation of a track wheel of the locomotive and having an electrical energy output variable with the track speed of said wheel, a movable indicator, an electrical actuator therefor, a transformer having a primary coil energized by said output of the generator and a secondary coil electrically connected to the actuator to energize the same, a core movable in the transformer to modify the current induced in the secondary coil, and means for moving the core in predetermined ratio to the cut-off setting so as to bring the indicator to a zero position at any speed of the locomotive when the cut-off is adjusted for maximum draw bar pull at such speed.

6. The combination with the operating gear for the cut-off valve of a locomotive, of an alternating current generator driven by the rotation of a track wheel of the locomotive and having an electrical energy output variable with the track speed of said wheel, a movable indicator, an electrical actuator therefor, a transformer having a primary coil energized by said output of the generator and a secondary coil electrically connected to the actuator to energize the same, a core movable in the transformer to vary the current induced in the secondary coil, a cam controlling movement of the core, and means for operating the cam in accordance with the cut-off setting, the contour of the cam being such as to vary the current induced in the secondary so as to bring the indicator to a zero position when the cut-off is adjusted for maximum draw bar pull at the instant speed of the locomotive.

7. A method of determining cut-off settings of a locomotive with respect to maximum draw bar pull at various speeds, which method consists in generating a primary alternating electric current varying in value in proportion to the speed of the locomotive, producing a secondary current by induction from the primary current, varying the induction in predetermined relation to the cut-off settings such that the secondary current will have a predetermined basic valuation for any speed of the locomotive if the cut-off is adjusted to produce maximum draw bar pull at said speed, and indicating any departures of the secondary current from said valuation as a reference point.

ALEXANDER R. BOND.